(12) United States Patent
Gress et al.

(10) Patent No.: US 10,894,359 B2
(45) Date of Patent: Jan. 19, 2021

(54) EXTRUDER FOR A 3D PRINTER WITH A VARIABLE MATERIAL THROUGHPUT

(71) Applicant: Robert Bosch GmbH, Stuttgart (DE)

(72) Inventors: Antonius Gress, Ornbau (DE); Hendrik Jahnle, Leutenbach (DE); Jan Tremel, Erlangen (DE); Markus Feigl, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 16/319,424

(22) PCT Filed: Jun. 21, 2017

(86) PCT No.: PCT/EP2017/065161
§ 371 (c)(1),
(2) Date: Jan. 21, 2019

(87) PCT Pub. No.: WO2018/015092
PCT Pub. Date: Jan. 25, 2018

(65) Prior Publication Data
US 2019/0263061 A1    Aug. 29, 2019

(30) Foreign Application Priority Data
Jul. 22, 2016    (DE) .................. 10 2016 213 439

(51) Int. Cl.
*B29C 64/209*    (2017.01)
*B29C 48/255*    (2019.01)
(Continued)

(52) U.S. Cl.
CPC ............ *B29C 64/209* (2017.08); *B29C 48/02* (2019.02); *B29C 48/2556* (2019.02);
(Continued)

(58) Field of Classification Search
CPC ... B29C 64/209; B29C 64/106; B29C 48/397; B29C 48/02; B29C 48/30; B29C 48/301;
(Continued)

(56) References Cited

U.S. PATENT DOCUMENTS 4,164,385 A * 8/1979 Finkensiep ............ C11D 13/18
425/204
5,125,817 A * 6/1992 Yamachika ......... B29C 45/1603
264/328.13
(Continued)

FOREIGN PATENT DOCUMENTS

CN    204160774        2/2015
CN    204160774 U  *  2/2015
(Continued)

OTHER PUBLICATIONS

International Search Report for Application No. PCT/EP2017/065161 dated Sep. 27, 2017 (English Translation, 2 pages).

*Primary Examiner* — Joseph S Del Sole
*Assistant Examiner* — Jerzi H Moreno Hernandez
(74) *Attorney, Agent, or Firm* — Michael Best & Friedrich LLP

(57) ABSTRACT

Extruder (1) for a 3D printer, comprising at least one outer nozzle (2) and a conveying worm (3) for feeding liquid and/or plasticized starting material (4) into the interior chamber (21) of the outer nozzle (2), wherein an inner nozzle (5) is arranged in the interior chamber (21) of the outer nozzle (2), wherein the interior chamber (51) of the inner nozzle (5) is connected to the interior chamber (21) of the outer nozzle (2) via at least one duct (52, 52a, 52b) which is continuous for the starting material (4), and wherein the inner nozzle (5) is mounted such that it can be moved linearly along the longitudinal axis (2a) of the outer nozzle (2). A 3D printer (100) having the extruder (1) and means (8) for generating a relative movement between the extruder (1)
(Continued)

and a construction surface (101), on which the object (102) to be manufactured is produced.

18 Claims, 3 Drawing Sheets

(51) Int. Cl.
    *B29C 48/30*     (2019.01)
    *B33Y 30/00*     (2015.01)
    *B29C 64/106*     (2017.01)
    *B29C 48/02*     (2019.01)
    *B29C 48/45*     (2019.01)

(52) U.S. Cl.
    CPC .......... *B29C 48/302* (2019.02); *B29C 64/106* (2017.08); *B29C 48/45* (2019.02); *B29C 2948/926* (2019.02); *B33Y 30/00* (2014.12)

(58) Field of Classification Search
    CPC .............. B29C 48/302; B29C 48/2556; B29C 2948/926; B33Y 30/00
    See application file for complete search history.

(56) References Cited

U.S. PATENT DOCUMENTS

| | | | | |
|---|---|---|---|---|
| 5,764,521 A | * | 6/1998 | Batchelder | B29C 48/30 |
| | | | | 700/196 |
| 2011/0215501 A1 | * | 9/2011 | Elyasi | B29C 41/42 |
| | | | | 264/219 |
| 2015/0321419 A1 | * | 11/2015 | Linthicum | B29C 48/02 |
| | | | | 264/308 |
| 2016/0046073 A1 | * | 2/2016 | Hadas | B29C 48/30 |
| | | | | 264/211.21 |
| 2016/0303802 A1 | * | 10/2016 | Meshorer | B33Y 30/00 |
| 2019/0036337 A1 | * | 1/2019 | Zhang | B29C 64/20 |

FOREIGN PATENT DOCUMENTS

| | | | |
|---|---|---|---|
| CZ | 2009616 A3 | * | 3/2011 |
| EP | 2266782 | | 12/2010 |
| KR | 101734862 B1 | * | 5/2017 |
| WO | 2016004642 | | 1/2016 |
| WO | 2016052228 | | 4/2016 |
| WO | 2016072549 | | 5/2016 |

\* cited by examiner

EXTRUDER FOR A 3D PRINTER WITH A VARIABLE MATERIAL THROUGHPUT

BACKGROUND OF THE INVENTION

The present invention relates to an extruder with variable material throughput for 3D printers for the additive manufacture of objects.

For the additive manufacture of objects by means of 3D printing, the starting material is applied layer by layer and thus composed to form the object to be produced. For this purpose, it is possible for example by software for the three-dimensional form of the object to be broken down into a multiplicity of layers stacked one above the other. Said sections indicate the points at which each layer manufactured by the 3D printer is in each case to be covered with starting material. The starting material is normally applied in melted or plasticized form through a nozzle.

For the printing of solid objects, in a large number of layers, in each case large areas are to be filled with starting material. The larger the diameter of the nozzle for the starting material is selected to be, the quicker the areas can be filled. On the other hand, filigree outer contours of the object are able to be produced with greater precision, the smaller the diameter of the nozzle. In the case of 3D printers having only one fixed nozzle diameter, there is thus a conflict of aims in this respect.

In WO 2016/052 228 A1, it is therefore proposed to switch between different nozzles during the printing. In WO 2016/004 642 A1 and in WO 2016/072 549 A1, in each case various ways are proposed in which the effective diameter of one and the same nozzle can be changed during the printing.

SUMMARY OF THE INVENTION

Within the scope of the invention, an extruder for a 3D printer has been developed. Said extruder comprises at least one outer nozzle and a conveying screw for feeding liquid and/or plasticized starting material into the interior space of the outer nozzle.

According to the invention, an inner nozzle is arranged in the interior space of the outer nozzle. Here, the interior space of the inner nozzle is connected to the interior space of the outer nozzle via at least one duct, which is continuous for the starting material. The inner nozzle is mounted in a manner linearly movable along the longitudinal axis of the outer nozzle.

It has been realized that, in this way, the effective cross section for the ejection of starting material can be varied in a particularly simple manner in terms of design, and that at the same time a particularly large range between the maximum and minimum effective cross sections is able to be realized. If the inner nozzle is moved into the vicinity of the outlet opening of the outer nozzle, said inner nozzle completely or partially blocks this outlet opening. However, then, the starting material can still enter the interior space of the inner nozzle through the duct and emerge from the outlet opening of the inner nozzle in the direction of the object to be produced. The smaller diameter of the outlet opening of the inner nozzle is then relevant both for the precision and for the speed of the application of material. By contrast, if the inner nozzle is moved away from the outlet opening of the outer nozzle, the larger diameter of this outlet opening is relevant. Via the linear movement of the inner nozzle, it is possible to set not only said two extremes but also intermediate values.

In this case, the feeding of the starting material via the conveying screw has the effect that, in the interior space of the outer nozzle, a controllable pressure is constantly built up and the application of material is thus realized in a uniform manner, specifically largely independently of the material properties of the starting material. A uniform pressure is important in particular if the starting material is to be conveyed firstly through the duct into the interior space of the inner nozzle and subsequently through the outlet opening of the inner nozzle. In a large number of conventional 3D printers, the starting material is by contrast fed in the form of a solid filament and melted in front of the outlet opening of the nozzle. The pressure of the melt in front of the outlet opening is then generated by the advancement force with which the filament is subsequently pushed in the direction of the melt. Said advancement force is exerted by a conveying mechanism which is at a large distance from the outlet opening, and it is additionally imparted by the elastic properties of the starting material in the solid state. By contrast, firstly the conveying screw is able to exert the pressure on the starting material at a place located significantly closer to the outlet opening, and secondly the pressure acts directly on the melted and/or plasticized starting material, without being imparted by a long piece of a solid filament.

The possibility of switching from a small outlet opening of the inner nozzle to the significantly larger outlet opening of the outer nozzle broadens the class of starting materials which can be used. For example, it is possible to use polymers which are reinforced with glass or carbon fibers, or else for example with glass balls. The fibers or glass balls could clog the small outlet opening of the inner nozzle. In the case of such starting materials, the exertion of pressure via the conveying screw is advantageous to the extent that there is no longer the risk that, as a result of the fibers or glass balls, the filament becomes jammed in its guide.

In a particularly advantageous configuration of the invention, by way of the linear movement of the inner nozzle along the longitudinal axis of the outer nozzle, the outer periphery of the inner nozzle is able to be brought into sealing engagement with the inner periphery of the outer nozzle. In this state, the only path along which the starting material can still emerge in the direction of the object to be produced leads from the interior space of the outer nozzle into the interior space of the inner nozzle through the duct, and finally through the outlet opening of said inner nozzle.

In a further particularly advantageous configuration of the invention, this sealing engagement is firstly linear and, with further advancement of the inner nozzle in the direction toward the outlet opening of the outer nozzle, widens into an areal seal. In this way, additional emergence of starting material from the outlet opening of the outer nozzle can be minimized by the linear movement of the inner nozzle, by which a switch to a low throughflow rate of starting material is indeed precisely to be realized.

This applies in particular if, with the further advancement of the inner nozzle, the sealing engagement widens in the direction of said advancement. For the starting material situated in the gap between the outer periphery of the inner nozzle and the inner periphery of the outer nozzle, which is displaced by the forward movement of the inner nozzle, the direction of movement back in the direction of the conveying screw is then predefined as a preferred direction.

Widening of an initially linear seal to an areal seal with further advancement of the inner nozzle can be realized for example in that the outer periphery of the inner nozzle tapers toward the outlet opening of the inner nozzle at an angle α, which differs from the angle β at which the inner periphery of the outer nozzle tapers toward the outlet opening of the outer nozzle.

In a further particularly advantageous configuration of the invention, the inner nozzle is mounted rotatably on the conveying screw via a bearing element. The conveying screw is already connected to a drive source in order to be set in rotational motion and thus to convey the starting material. The fact the said screw is provided with a further linear degree of freedom along the longitudinal axis of the outer nozzle means that it can be additionally used as an actuating element for moving the inner nozzle and thus changing the throughput of starting material. If the outer periphery of the inner nozzle bears sealingly against the inner periphery of the outer nozzle, the inner nozzle is held against the outer nozzle due to the frictional force. The fact that the bearing arrangement at the conveying screw is rotatable means that the rotation of the conveying screw is not hindered, and no wear is produced as a result of rotation, forced counter to the friction, of the inner nozzle against the outer nozzle.

Furthermore, the emergence of starting material from the extruder can be stopped particularly quickly in that, for example, in a coordinated manner, the rotation of the conveying screw is stopped and the conveying screw, including the inner nozzle mounted thereon, is retracted from the outlet opening of the outer nozzle. In this way, a negative pressure is generated at the outlet opening of the outer nozzle, which negative pressure draws the liquid starting material which is still present at said opening back into the outer nozzle. This is advantageous in particular if the application of material is ended at a location on the object to be produced and is to be continued at another location.

The build-up of pressure in the interior space of the outer nozzle by the conveying screw functions independently of when and in what way the starting material was rendered liquid and/or plasticized. It is not even necessary that the starting material has a solid state of aggregation and is liquefied only shortly prior to the extrusion. The starting material may also be for example a material which is liquid from the outset and which hardens after being applied to the object to be produced.

In a further particularly advantageous configuration of the invention the conveying screw is guided in a cylinder which, at a first end, has a feeder for the starting material and, at its second end, opens out into the outer nozzle. Said cylinder may in particular have at least one heater for the starting material. The starting material may then, for example, be fed to the cylinder in solid form, for example in the form of granules, and be melted and/or plasticized along its path through the cylinder. The fact that it is no longer necessary to generate the pressure on the liquid phase of the starting material by the subsequent pushing of a filament means that it is also advantageously possible to use starting materials for which this type of pressure generation, or else melting from a solid filament, is difficult. For example, use may be made of granules of plastics which would be significantly more elastic as a filament than the polyactides (PLA) mainly used to date. The plastic may be for example any thermoplastic polymer. Use may also be made of granules of low-melting metals, for example magnesium. Metals, in particular, can be melted in granular form significantly more easily than in filament form since the heat introduced is no longer dissipated to a large extent by the conductive filament.

The heater may for example be designed to produce different temperature zones, in particular three zones, along the longitudinal axis of the cylinder. When passing through one temperature zone after the other, the starting material can be brought in a manner plasticized, homogenized, compressed and reliable in processing terms, reproducible and stable into a specific temperature window for the application to the object to be produced. In particular, the starting material can remain in said temperature window only for a short dwell time suited to plastics.

This can be additionally promoted in a further particularly advantageous configuration of the invention in that the outer diameter and/or the pitch of the conveying screw varies along the longitudinal axis of the cylinder. It is also possible for the pitch and/or the outer diameter to vary between different zones, in particular between three zones.

The invention also relates to a 3D printer having an extruder according to the invention, wherein, in addition to the extruder itself, means for generating a relative movement between the extruder and a construction surface on which the object to be produced is formed are also provided.

In the simplest configuration of the invention, means are provided for displacing the construction surface in at least three spatial directions. The extruder can then be positionally fixed.

Alternatively or else in combination, for generating the relative movement, it is possible to provide a robot for moving the extruder in at least four axes, in particular in five axes. For this purpose, the tracing paths of the extruder can be calculated for example by a software from a 3D CAD model. In particular, structures which are inclined with respect to the vertical and closed objects can be manufactured particularly precisely if the extruder is able to be inclined with respect to the object to be produced. Furthermore, a robot typically has a significantly larger movement range than common devices for displacing the construction surface. It is therefore better suited for producing relatively large objects.

BRIEF DESCRIPTION OF THE DRAWINGS

Further measures which improve the invention will be presented more specifically below together with the description of the preferred exemplary embodiments of the invention on the basis of figures.

Exemplary Embodiments

In the figures:

FIG. 1 shows a detail illustration of the inner nozzle within the outer nozzle;

FIG. 2 shows an exemplary embodiment of the complete extruder;

FIG. 3 shows an exemplary embodiment of a 3D printer with the extruder according to the invention.

DETAILED DESCRIPTION

Figure 1:
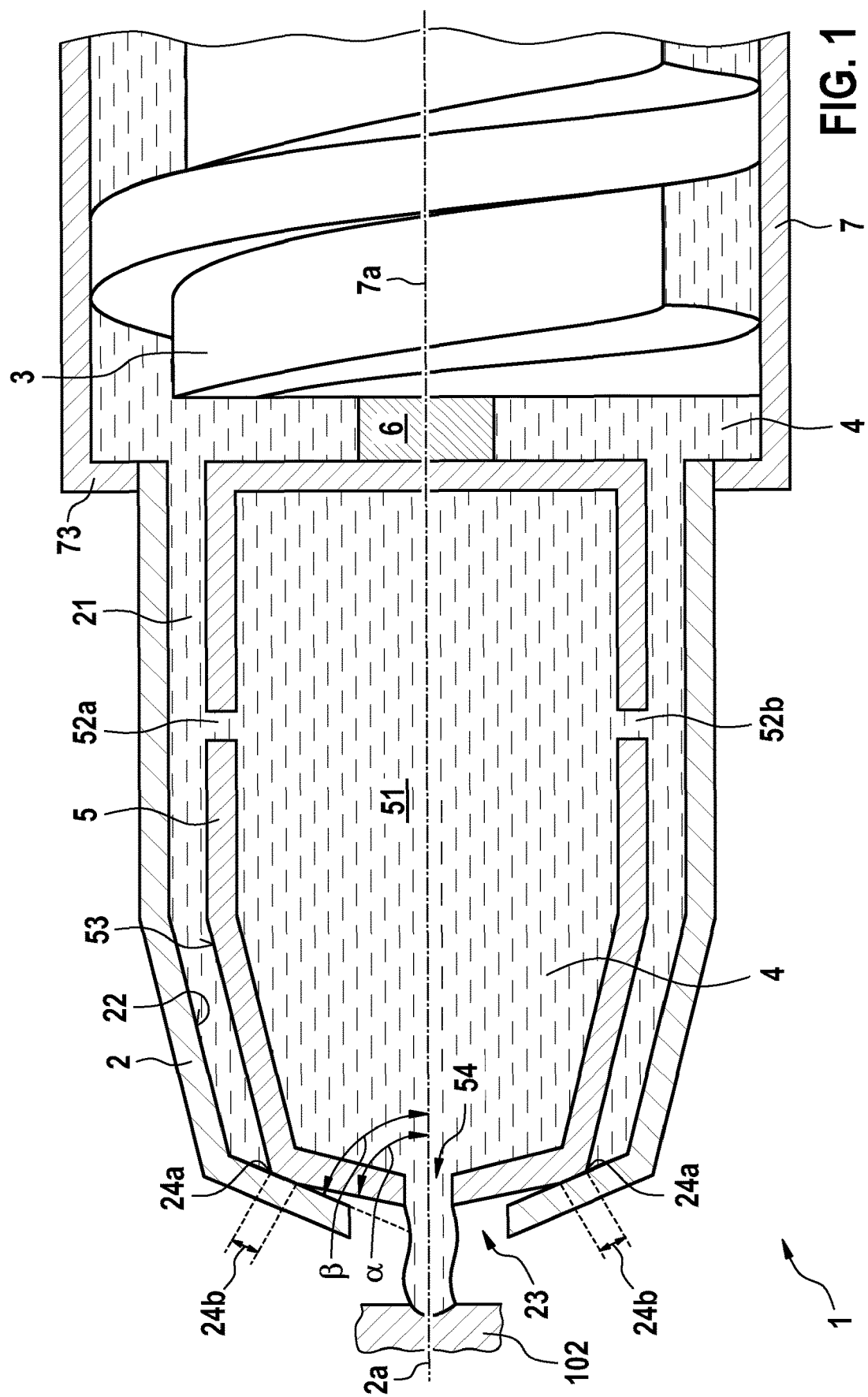

FIG. 1 shows one part of the extruder 1 in a sectional drawing. The extruder 1 comprises an outer nozzle 2 and an inner nozzle 5. The inner nozzle 5 is situated in the interior space 21 of the outer nozzle 2. The inner nozzle 5 is mounted rotatably on the conveying screw 3 via a bearing 6, said conveying screw being guided in a cylinder 7 and, when rotating about its own axis, which is identical to the longitudinal axis 7a of the cylinder 7, conveying liquid starting material 4 into the interior space 21 of the outer nozzle 2. The left-hand end 73 of the cylinder 7 opens out into the outer nozzle 2.

If the conveying screw 3 is moved along the longitudinal axis 7a of the cylinder 7, which is identical to the longitudinal axis 2a of the outer nozzle 2, then the inner nozzle 5 is moved along therewith. In the situation shown in FIG. 1, the inner nozzle 5 is situated at its left-hand stop. When the inner nozzle 5 was moved to the left, firstly the edge 24a on the outer periphery 53 of the inner nozzle 5 made contact with the inner periphery 22 of the outer nozzle 2 and brought about a first, linear seal between the outer periphery 53 of the inner nozzle 5 and the inner periphery 22 of the outer nozzle 2. Further movement of the inner nozzle 5 to the left resulted in said linear seal 24a being expanded into an areal seal 24b in the direction toward the outlet opening 54. This was effected by virtue of the fact that the outer periphery 53 of the inner nozzle 5 tapers at an angle α which is more acute than the angle β at which the inner periphery 22 of the outer nozzle 2 tapers.

The areal seal 24b prevents the direct passage of starting material 4 from the interior space 21 of the outer nozzle 2 to the outlet opening 23 of the outer nozzle 2. The passage through the ducts 52a and 52b into the interior space 51 of the inner nozzle 5 remains as the only way out for the liquid starting material 4 subjected to pressure by the conveying screw 3. The starting material 4 finally emerges from the inner nozzle 5, and passes to the object 102 to be produced, through the outlet opening 54.

The position, shown in FIG. 1, of the inner nozzle 5, in which position said inner nozzle bears fixedly, due to friction, against the inner periphery 22 of the outer nozzle 2, is the extrusion position, in which only the small outlet opening 54 of the inner nozzle 5 is relevant. Said outlet opening 54 may have for example a diameter of between 0.2 mm and 0.4 mm, preferably 0.3 mm. In said position, the size of the outlet opening 23 of the outer nozzle 2 is unimportant for the application of the starting material 4 to the object 102 to be produced.

If the inner nozzle 5 is moved together with the conveying screw 3 to the right, then the seal 24a, 24b between the outer periphery 53 of the inner nozzle 5 and the inner periphery 22 of the outer nozzle 2 is broken. In the interior space 21 of the outer nozzle 2, the starting material 4 can then pass directly to the outlet opening 23 of the outer nozzle 2, without passing through the ducts 52a, 52b and the interior space 51 of the inner nozzle 5 beforehand. The latter path is as before open to the starting material 4. However, since the direct path to the outlet opening 23 of the outer nozzle 2 has a significantly larger cross section, most of the starting material 4 will take this path. Accordingly, the significantly larger outlet opening 23 is relevant for the application of material to the object 102 to be produced. Said position is the middle position of the inner nozzle 5.

If the inner nozzle 5 is moved even further to the right and, at the same time, the rotation of the conveying screw 3 stopped, then no more starting material 4 is pressed through the outlet openings 23 and 54. Instead, the starting material 4 which is still present in the region of the outlet opening 23 is drawn back into the outer nozzle 2. This is the retracted position of the inner nozzle 5. In said position, the extruder can be displaced for example to another location of an extended object 102 to be produced in order, there, to apply further starting material 4.

It should be mentioned in this context that a mere partial blockage of the central region of the outlet opening 23 of the outer nozzle 2 with a plug which is able to be displaced linearly along the axis 2a does not have the effect that the extruder 1 adds relatively fine structures from the starting material 4 to the object 102 to be produced. Although such a blockage would narrow the passage through the outlet opening 23 to an annular gap, beyond said annular gap, the starting material 4 coming from different angular positions of the annular gap would, on account of its viscosity, again combine to form a mass which again has the size of the outlet opening 23.

Figure 2:
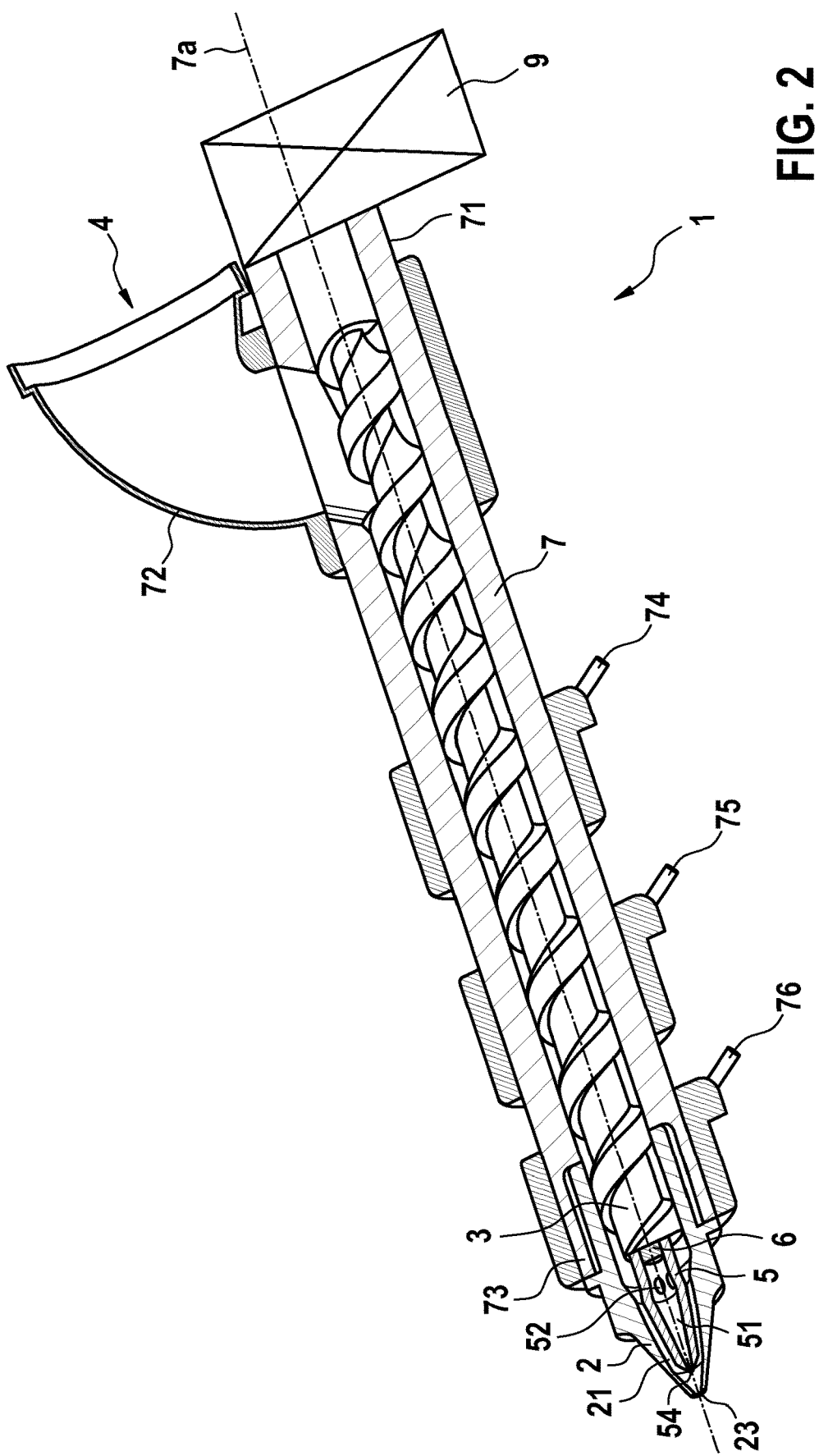

FIG. 2 shows a partially sectional total view of the extruder 1, in which the details, shown in FIG. 1, of the nozzles 2 and 5 are suppressed. The cylinder 7, whose second end 73 opens out into the outer nozzle 2, is supplied with the starting material 4 in granular form at its first end 71 via a hopper 72. Along the longitudinal axis 7a of the cylinder 7, both the outer diameter and the pitch of the conveying screw 3 vary. This, in combination with the three thermostatically regulated heating elements 74, 75 and 76, has the effect that the starting material 4 is gradually plasticized before it enters the outer nozzle 2.

The conveying screw 3 is driven via a servo motor 9. The servo motor 9 not only sets the conveying screw 3 in rotation, but also drives its linear movement along the longitudinal axis 7a of the cylinder 7. Accordingly, it is also possible by way of this servo motor 9 to set whether the starting material is to emerge from the large outlet opening 23 of the outer nozzle 2 or from the small outlet opening 54 of the inner nozzle 5.

Figure 3:
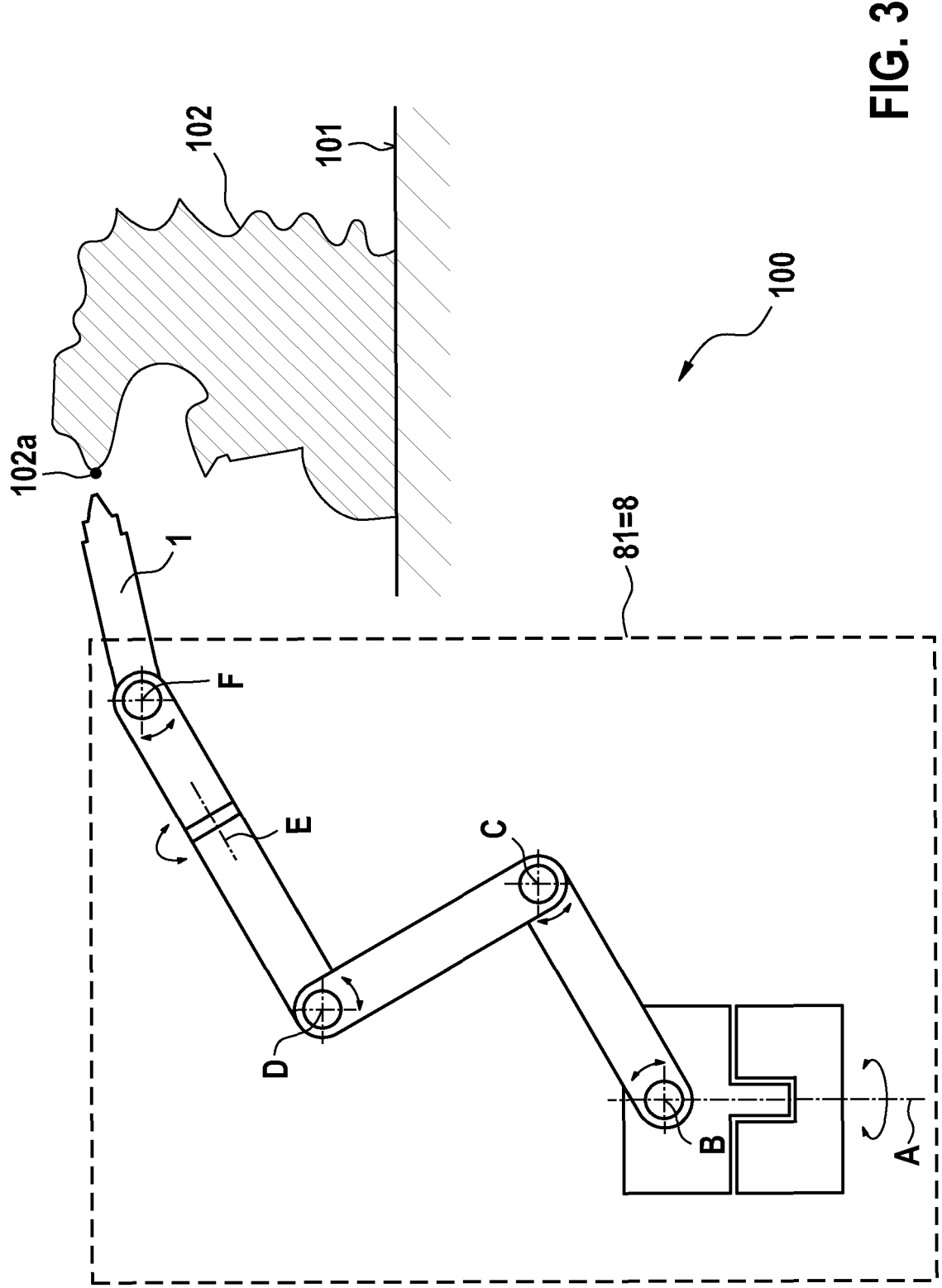

FIG. 3 illustrates the integration of the extruder 1 according to the invention into a 3D printer 100 for the production of spatially extended objects 102 on a construction surface 101. The relative movement between the extruder 1 and the object 102 to be produced is provided by an industrial robot 81 which is movable about six axes A to F in the directions illustrated in each case by arrows.

In one embodiment, the 3D printer 100 has the extruder 1, wherein, in addition to the extruder itself, means 8 for generating a relative movement between the extruder 1 and a construction surface 101 on which the object 102 to be produced is formed are also provided.

In this way, the extruder 1 not only acquires a large radius of action, but is in particular also able to add to the object 102 to be produced starting material 4 from any desired angles. If in the example shown in FIG. 3, additional material is to be added to the object 102 for example at the point 102a depicted by way of example, then the application from the angle shown in FIG. 3 is more advantageous than the application vertically from above, since the point 102a is situated on an overhang.

In this context, the advancement of the starting material 4 via a conveying screw 3 is in turn more advantageous than the advancement as a solid filament practiced in the case of most conventional 3D printers. In particular, the pressure build-up in the extruder 1 is more independent of location, and a fill of granules as starting material 4 is able to be handled more easily than a filament to be unrolled.

The invention claimed is:

1. An extruder (1) for a 3D printer, the extruder comprising at least one outer nozzle (2) and a conveying screw (3) for feeding liquid and/or plasticized starting material (4) into an interior space (21) of the outer nozzle (2), characterized in that an inner nozzle (5) is arranged in the interior space (21) of the outer nozzle (2), wherein the inner nozzle (5) is mounted rotatably on the conveying screw (3) via a bearing element (6), wherein an interior space (51) of the inner nozzle (5) is connected to the interior space (21) of the outer nozzle (2) via at least one duct (52, 52a, 52b), wherein the at least one duct (52, 52a, 52b) allows the starting material (4) to pass from the interior space (21) of the outer nozzle (2) to the interior space (51) of the inner nozzle (5), wherein the inner nozzle (5) is mounted in a manner linearly movable along a longitudinal axis (2a) of the outer nozzle (2), wherein the outer nozzle has opposite front and rear ends spaced apart along the longitudinal axis, wherein the outer nozzle (2) has an outlet opening (23) at the front end and an inner surface (22) defining the interior space (21) of the outer nozzle (2), wherein a portion of the inner surface (22) of the outer nozzle (2) faces toward the rear end, wherein the inner nozzle (5) is movable along the longitudinal axis (2a) toward and away from a position in which an outer surface (53) of the inner nozzle (5) is brought into a sealing engagement (24a, 24b) with the portion of the inner surface (22) of the outer nozzle (2), and wherein the sealing engagement (24a, 24b) is configured to prevent direct passage of the starting material (4) from the interior space (21) of the outer nozzle (2) to the outlet opening (23) of the outer nozzle (2) and to allow indirect passage of the starting material (4) from the interior space (21) of the outer nozzle (2) to the outlet opening (23) of the outer nozzle (2) via the at least one duct (52, 52a, 52b), the interior space (51) of the inner nozzle (5) and an outlet opening (54) of the inner nozzle (5).

2. The extruder (1) as claimed in claim 1, characterized in that, with movement of the inner nozzle (5) along the longitudinal axis (2a) of the outer nozzle (2) in a direction toward the outlet opening (23) of the outer nozzle (2), the sealing engagement is firstly linear (24a) and, with further advancement of the inner nozzle (5), widens into an areal seal (24b).

3. The extruder (1) as claimed in claim 2, characterized in that, with the further advancement of the inner nozzle (5), the sealing engagement (24a) widens in the direction of said advancement.

4. The extruder (1) as claimed in claim 1, characterized in that a portion of the outer surface (53) of the inner nozzle (5) tapers toward the outlet opening (54) of the inner nozzle (5) at an angle α, which differs from an angle β at which the portion of the inner surface (22) of the outer nozzle (2) tapers toward the outlet opening (23) of the outer nozzle (2).

5. The extruder (1) as claimed in claim 1, characterized in that the conveying screw (3) is guided in a cylinder (7) which, at a first end (71), has a feeder (72) for the starting material (4) and, at a second end (73), opens out into the outer nozzle (2).

6. The extruder (1) as claimed in claim 5, characterized in that the cylinder (7) has at least one heater (74, 75, 76) for heating the starting material (4).

7. The extruder (1) as claimed in claim 5, characterized in that an outer diameter and/or a pitch of the conveying screw (3) vary/varies along a longitudinal axis (7a) of the cylinder (7).

8. A 3D printer (100) comprising at least one extruder (1) as claimed in claim 1, and means (8) for generating a relative movement between the extruder (1) and a construction surface (101) on which an object (102) to be produced is formed.

9. The 3D printer (100) as claimed in claim 8, characterized in that the means (8) is configured for displacing the construction surface (101) in at least three spatial directions.

10. The 3D printer (100) as claimed in claim 8, characterized in that the means (8) comprise a robot (81) for moving the extruder (1) in at least four axes.

11. The 3D printer (100) as claimed in claim 8, characterized in that, with movement of the inner nozzle (5) along the longitudinal axis (2a) of the outer nozzle (2) in a direction toward the outlet opening (23) of the outer nozzle (2), the sealing engagement is firstly linear (24a) and, with further advancement of the inner nozzle (5), widens into an areal seal (24b).

12. The 3D printer (100) as claimed in claim 11, characterized in that, with the further advancement of the inner nozzle (5), the sealing engagement (24a) widens in the direction of said advancement.

13. The 3D printer (100) as claimed in claim 8, characterized in that a portion of the outer surface (53) of the inner nozzle (5) tapers toward the outlet opening (54) of the inner nozzle (5) at an angle α, which differs from an angle β at which the portion of the inner surface (22) of the outer nozzle (2) tapers toward the outlet opening (23) of the outer nozzle (2).

14. The 3D printer (100) as claimed in claim 8, characterized in that the conveying screw (3) is guided in a cylinder (7) which, at a first end (71), has a feeder (72) for the starting material (4) and, at a second end (73), opens out into the outer nozzle (2).

15. The 3D printer (100) as claimed in claim 14, characterized in that the cylinder (7) has at least one heater (74, 75, 76) for heating the starting material (4).

16. The 3D printer (100) as claimed in claim 14, characterized in that an outer diameter and/or a pitch of the conveying screw (3) vary/varies along a longitudinal axis (7a) of the cylinder (7).

17. The extruder (1) as claimed in claim 1, wherein the outlet opening (54) of the inner nozzle (5) is in the interior space (21) of the outer nozzle (2) when the inner nozzle is brought into contact with the portion of the inner surface (22) of the outer nozzle (2).

18. The extruder (1) as claimed in claim 4, wherein the angle β is less than the angle α.

* * * * *